April 14, 1964    H. GILBERT    3,129,362
RELAY CONTROL CIRCUITS
Filed Dec. 5, 1960
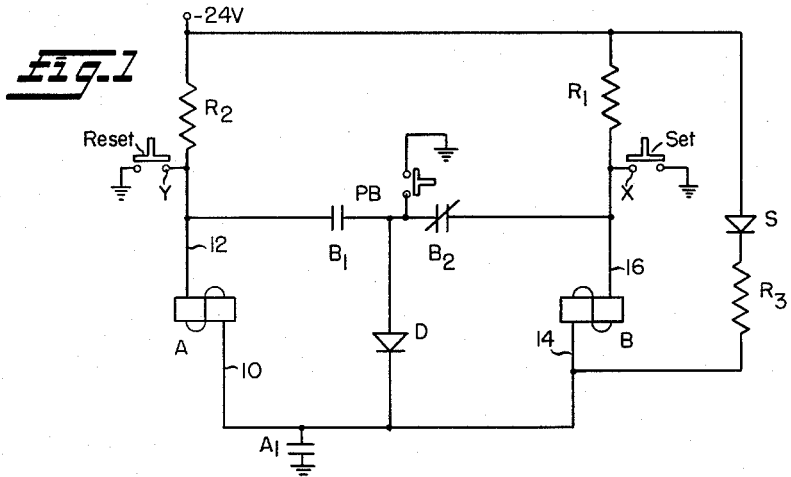
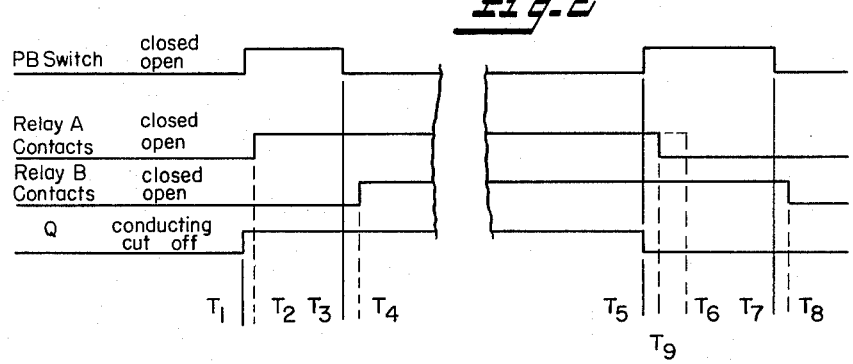
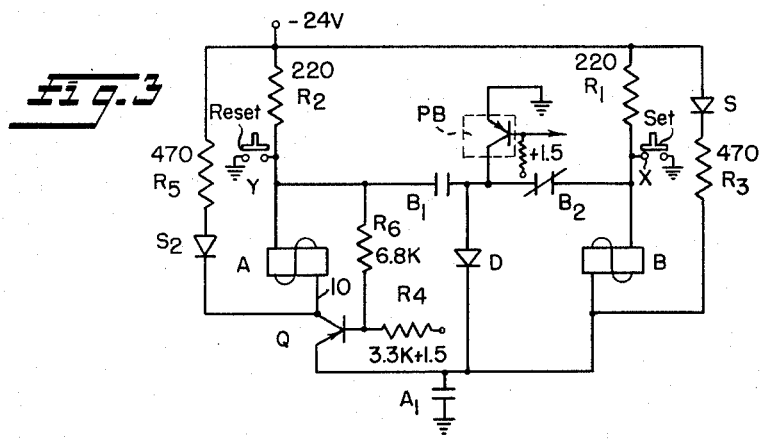
INVENTOR
Herbert Gilbert
BY *Strauch, Nolan & Neale*
ATTORNEYS

United States Patent Office 3,129,362
Patented Apr. 14, 1964

3,129,362
RELAY CONTROL CIRCUITS
Herbert Gilbert, Berkeley, Calif., assignor to SCM Corporation, a corporation of New York
Filed Dec. 5, 1960, Ser. No. 73,859
5 Claims. (Cl. 317—140)

The present invention relates to relay control circuits and more particularly to the type of circuit arrangement whereby two relays are sequentially operated by a single control device in the circuit.

A primary object of the present invention is to provide a novel circuit to sequence two or more devices on or off and then to reverse the on-off state of the devices in the same sequence. The relay that is first on (pulled in) is the first off (dropped out).

A further object of this invention is to provide a circuit of the foregoing type which is operable from a single position in the circuit, such as with a normally open momentary switch, and also to provide means at other points in the circuit to set (or reset) the circuit to a known one of its conditions.

Another object of the invention is to provide a circuit of the foregoing type which is capable of high speed operation thereby enabling it to be actuated by electronically generated pulses by use of a transistor drive for at least one of the relay winding circuits whereby rapid drop out of the relay is effected.

Other objects of the invention are to provide a novel relay control circuit in which a minimum number of control contact elements are used, wherein full voltage is applied to both relays rather than operating the relays in a series circuit arrangement, and wherein each of the transition states of the circuit are unique to thereby provide indications as to whether the circuit is being set or reset.

These and other objects of the invention will become more fully apparent from the claims, and from the description as it proceeds in connection with the drawings wherein:

FIGURE 1 is a circuit diagram, partly diagrammatic, of a relay control circuit employing two relays which embodies the present invention;

FIGURE 2 is a timing chart which illustrates the sequence of operation of the circuit of FIGURE 1; and FIGURE 3 is a circuit similar to FIGURE 1 but employing a transistor to reduce the drop out time of relay A.

Referring now to the drawings and more particularly to FIGURE 1, where the relay control circuit embodying the present invention is illustrated. This circuit includes a first relay A having a winding connected to leads 10 and 12 and a normally open grounded holding contact $A_1$, and a second relay B having a winding connected to leads 14 and 16, a normally open contact $B_1$ and a normally closed contact $B_2$. One terminal of each winding is connected to the ungrounded contact terminal of holding contact $A_1$ and to the negative terminal of diode or unidirectional current conducting device, or selectively conductible means D. Resistors $R_1$ and $R_2$ are connected between the other terminal of the windings of relays A and B and the negative power supply terminal. Normally open contact $B_1$ is connected between the positive terminal of diode D and lead 12 of relay winding A while normally closed contact $B_2$ is connected between the positive terminal of diode D and lead 16 of relay winding B.

Between the positive terminal of diode D and ground, a momentary switch PB is provided. Instead of a manually operated switch, an electronic switch such as a vacuum tube or transistor may be provided which is normally biased to be cut-off and which is pulsed to become conductive to thereby provide a momentary circuit connection to ground.

When push button switch PB is closed supplying ground through diode D to lead 10, a circuit through relay A and resistor $R_2$ is completed to thereby energize relay A. Because contacts $B_2$ are closed, ground is applied to leads 14 and 16 on both sides of relay winding B and therefore relay B remains de-energized.

FIGURE 2 is a timing chart which shows the sequential operation of relays A and B when ground is applied to the circuit at P, for example as by closing push button switch PB, at time $T_1$.

When push button switch PB is released and ground is therefore removed from contact P, relay A remains energized through closed holding contacts $A_1$ and a circuit is completed through closed contacts $A_1$, the winding of relay B and resistor $R_1$ to the —24 volt terminal thereby energizing relay B with resultant closing of normally open contact $B_1$ and opening of normally closed contact $B_2$. The transfer of contacts $B_1$ and $B_2$ does not affect operation of the circuit at this time, and the circuit remains with both relays energized until a further external switching is applied.

When it is desired to de-energize the relays, push button switch PB is again closed supplying ground to diode D. Since relay B is energized and contact $B_1$ is closed, ground will be supplied through switch PB to lead 12 to thereby ground both sides of relay A and cause relay A to drop out thereby opening holding contact $A_1$. During this time relay B is maintained energized because contact $B_2$ is open and ground is provided through diode D and closed switch PB.

When ground is removed from diode D by opening push button switch PB relay B also drops out of the circuit.

Resistor $R_3$ and diode S are provided to suppress the inductive kick caused when either relay winding is de-energized. Diode S is so poled that when the inductive kick occurs, current flows through $R_3$ and the energy of the collapsing field is dissipated.

It will be observed that in resetting the circuit, relay A is de-energized by grounding both lead 12 and lead 10. An interval on the order of about 19 or 20 milliseconds is required for drop out of relay A, as compared with normal pull in and drop out times of 8 to 10 milliseconds.

If the connection to ground through switch contacts PB is maintained for less than the drop out time for relay A and then again opened, holding contact $A_1$ remains closed, relay A remains energized after contacts PB open, and relay B remains continuously energized even though it may have been desired to de-energize both relays.

Where switch PB is an electronic switch and it is desired to turn auxiliary equipment on and off during the operation of data processing systems, the time interval available for effecting the resetting of the relays to their de-energized condition may be so short as to require that relay A drop out in less than 20 milliseconds. In FIGURE 3, a transistor Q is connected to lead 10 at one terminal of relay A so that the energizing current through relay A must pass also through transistor Q. The base of transistor Q is biased to a voltage negative with respect to ground by resistors $R_4$ which may be connected to a plus 1.5 volts and resistors $R_6$ and $R_2$ which may be connected to a minus 24 volts. When the emitter potential approaches ground level by completing the circuit to ground either through switch PB or holding contact $A_1$, transistor Q conducts.

When both relays A and B are energized and switch contacts $B_1$ are closed, conduction through switch PB places ground potential on resistor $R_6$ which thus causes the base potential to become positive with respect to the emitter potential and thereby causes current conduction through transistor Q to cut-off. Current conduction through relay A is thus cut-off by an open circuit rather than by merely placing ground potential on both sides of the winding of relay A as in the case of the circuit of FIGURE 1.

This results in a decrease in the time interval required for drop out of relay A from a time interval of about 19 milliseconds to about 8 to 10 milliseconds.

Referring now to the timing chart of FIGURE 2, the upper line indicates at its upper position the time ground potential is applied to diode D through switch contacts PB. When the circuit to ground through switch PB is first completed at time $T_1$, the winding of relay A becomes energized. At time $T_2$ or about 8 milliseconds later, the A contacts on relay A pull in. Nothing further occurs until the circuit to ground through switch PB opens at time $T_3$, at which time the winding of relay B becomes energized. At time $T_4$ or about 8 milliseconds after time $T_3$ the B contacts of relay B close and the circuit then remains in its set condition with both relays A and B energized.

When it is desired to reset the circuit, ground potential is again applied to diode D through switch PB at time $T_5$. This applies ground potential on both sides of relay A to thereby cause its contacts to pull out at time $T_6$, which in the case of the circuit of FIGURE 1, occurs in about 20 milliseconds. Nothing further happens until ground is removed from diode D by opening switch PB at time $T_7$, which then opens the circuit through the winding of relay B, and causes the B contacts to pull out at time $T_8$ which is about 8 milliseconds after time $T_7$.

With the circuit of FIGURE 3, transistor Q starts to conduct at time $T_1$ and continues to conduct all the time relay A is energized. At time $T_5$ when ground is again applied to diode D, current conduction by transistor Q immediately cuts off. This results in breaking the low resistance path through ground in parallel with the winding of relay A present in the circuit of FIGURE 1 for current resulting from the inductive kick when the energizing voltage applied to relay A is removed, and causes the contacts of relay A to drop out at time $T_9$, which is about 8 milliseconds after time $T_5$ and substantially earlier than time $T_6$. Resistor $R_5$ and diode $S_2$ are thus provided to dissipate the energy stored in the winding of coil A.

In use of the foregoing circuit as a bistable or binary device, it is desirable to be able to place the circuit in a predetermined initial condition before starting automatic operation. It may therefore be desired to provide additional means, such as normally open, momentary switches X and Y, for controlling operation of the relay circuit.

When the circuit is grounded as by a switch at X, and relay A and B are both de-energized, relay A is caused to energize through a circuit including normally closed contacts $B_2$ and diode D, and when the switch at X is opened, relay B then becomes energized through its usual circuit. If relays A and B are both intially energized, grounding the circuit at switch X temporarily de-energizes relay B, but does not affect the holding circuit of relay A, so that when the switch at X is opened, both relays remain energized. Therefore, after the switch at X has been momentarily closed, both relays remain energized irrespective of their initial condition.

At point Y in the circuit, a similar reset switch may be used to cause the relays to be left in an unenergized condition irrespective of their initial condition after it is momentarily closed. Thus if initially neither relay is energized, closing the reset switch at Y to apply ground on lead 12 when contact $B_1$ is open does not disturb the condition of the circuit. If both relays are energized, closing the reset switch at Y applies ground to both terminals on the winding of relay A to thereby cause it to become de-energized and holding contact $A_1$ to open so that when the reset switch is opened, relay B de-energizes.

Advantages of the circuit of the present invention are that it may be operated by manual depression of keys on a control console for a data processing system or by internal electronics in the system. The circuit is particularly useful for turning on and off auxiliary equipment such as paper tape and card punches and readers to thereby facilitate punching of only selected portions of the information as it is processed, and reading or writing information into the system from individual ones or a plurality of diverse types of input equipment. There is no need for encoding, for a register or a memory, the relays take up little space and may be mounted wherever convenient, and they provide toggle action for effecting satisfactory on-off switching.

Obviously, the additional contacts on relays A and B provided in commercially available relays and not illustrated in the drawings may be used for the circuits controlling the equipment to be turned on and off.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a relay control circuit:
    (a) two relays each having a winding with the first relay operating a pair of switch contact sets, one of said contact sets being normally open and one of said contact sets being normally closed and the second relay operating a normally open set of contacts;
    (b) a conducting device having unidirectional current carrying characteristics, and being provided with two terminals;
    (c) means connecting one of said terminals to both the normally closed contact set and the normally open contact set of said first relay and means connecting said one terminal through momentary switch means to an output terminal of a power supply;
    (d) means connecting one contact of the normally open contact set of said first relay to one terminal of the winding of the second relay and means connecting one contact of the normally closed contact set of said first relay to one terminal of the winding of said first relay;
    (e) means connecting the other terminal of the conducting device to the other terminal of the winding on each relay and means connecting said other terminal of the conducting device to said output terminal of the power supply through the normally open contact set of said second relay; and
    (f) means connecting the first mentioned terminal of each relay winding through a respective resistance to a reference terminal of the power supply.

2. In a relay control circuit:
    (a) two relays each having a winding with the first relay operating a pair of switch contact sets, one of said contact sets being normally open and one of said contact sets being normally closed and the second relay operating a normally open set of contacts;
    (b) selectively conductible means provided with two terminals;
    (c) means connecting one of said terminals to both normally closed contact set and the normally open contact set of said first relay and means connecting said one terminal through momentary switch means to an output terminal of a power supply;
    (d) means connecting one contact of the normally open contact set of said first relay to one terminal of the winding of the second relay and means connecting one contact of the normally closed contact set of said first relay to one terminal of the winding of said first relay;

(e) means connecting the other terminal of the selectively conductible means to the other terminal of the winding on each relay and means connecting said last mentioned terminal to said output terminal of the power supply through the normally open contact set of said second relay;

(f) means connecting the first mentioned terminal of each relay winding through a respective resistance to a reference terminal of the power supply; and (g) means for decreasing the drop-out time when de-energizing said second relay, the first relay to de-energize, comprising:
  (1) a transistor connected in series circuit arrangement between said other terminal of the second relay and said other terminal of the selectively conductible means; and
  (2) means in circuit with the transistor to bias the transistor to cut off current conduction through both said transistor and said second relay winding when said second relay winding is de-energized by actuation at the momentary switch means to connect the power supply to said first terminal of the selectively conductible means while said first relay winding remains energized.

3. The relay control circuit of claim 2, wherein said selectively conductible means is a conducting device having unidirection current-carrying characteristics.

4. In a relay control circuit:
(a) two relays each having a winding, a first relay operating at least a single-pole, double-throw set of contacts and the second relay operating at least a single-pole, single-throw normally-open set of contacts;

(b) a conducting device having unidirectional characteristics, said conducting device being provided with two terminals, one of which is connected to the pole of the contact set of said first relay and connected, through momentary switch means, to the output terminal of a power supply;

(c) the normally-open contact of the contact set of said first relay being connected to one terminal of the winding of the second relay and the normally-closed contact of said first relay contact set being connected to one terminal of the winding of said first relay;

(d) the other terminal of the conducting device being connected to the other terminal of the winding on each relay and to the normally-open contact of the contact set of said second relay, the pole of said second relay contact set being connected to said output terminal of the power supply; and (e) the first-mentioned terminal of each relay winding being connected through a respective resistance to the reference terminal of the power supply.

5. A two-relay binary as defined in claim 4 in combination with means for decreasing the drop-out time when de-energizing said relays, comprising:
(a) a transistor connected in series circuit arrangement between said other terminal of the second relay and said other terminal of the conducting device; and (b) means to bias the transistor to cut off current conduction through both said transistor and said second relay winding when said momentary switch means connects the power supply to said first terminal of the unidirectional conducting device subsequent to energization of both relays.

References Cited in the file of this patent
UNITED STATES PATENTS
1,751,263    Cesareo _____ Mar. 18, 1930